May 15, 1934.  E. O. NORMAN  1,958,835
PIPE
Filed Oct. 28, 1930   2 Sheets-Sheet 1
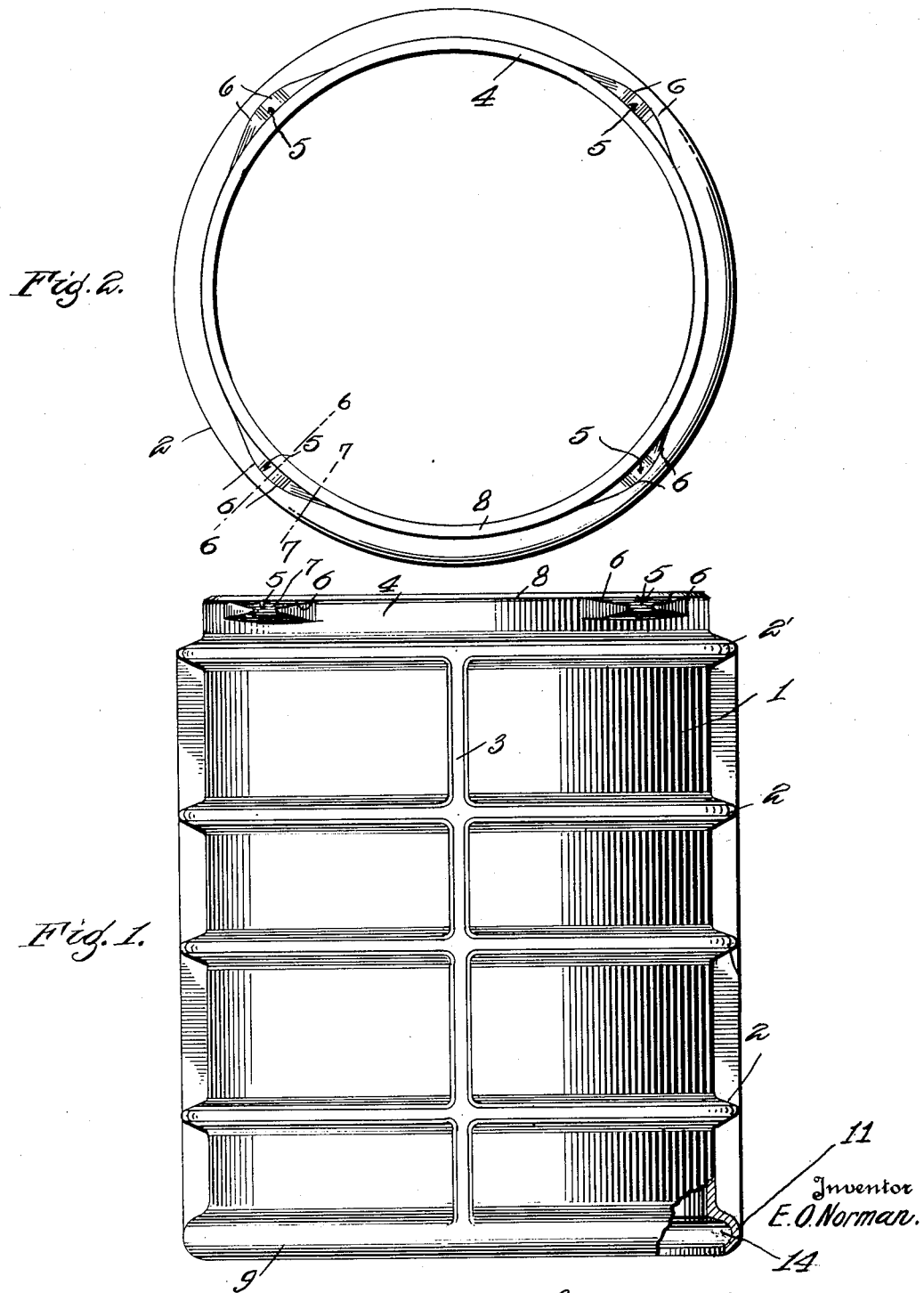

May 15, 1934.　　　　E. O. NORMAN　　　　1,958,835
PIPE
Filed Oct. 28, 1930　　　2 Sheets-Sheet 2
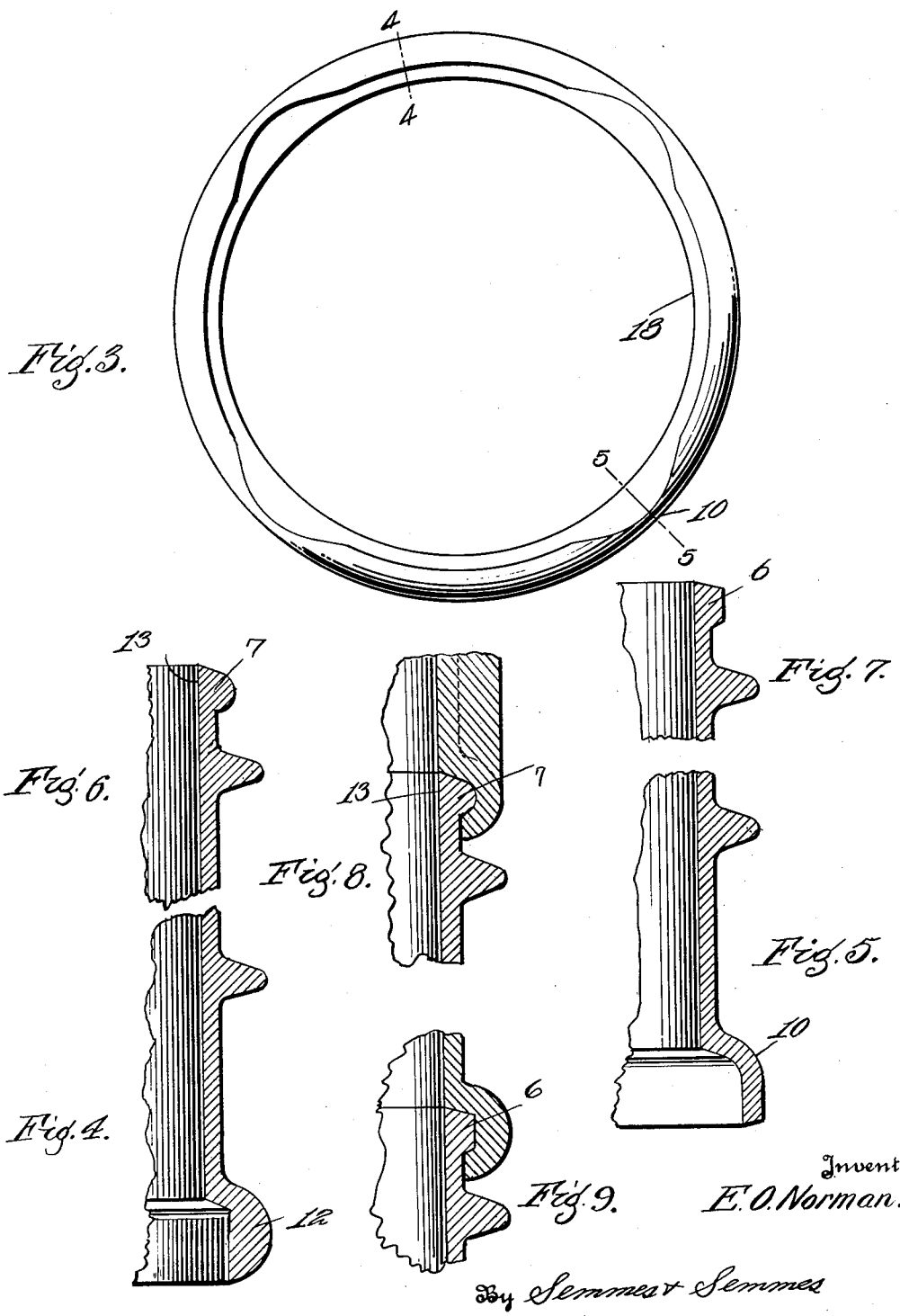

Patented May 15, 1934

1,958,835

UNITED STATES PATENT OFFICE 1,958,835

PIPE

Ephraim O. Norman, Talladega, Ala., assignor to Alabama Pipe Company, a corporation of Alabama Application October 28, 1930, Serial No. 491,763

5 Claims. (Cl. 285—175)

This invention relates to pipe, and more particularly that type having bell and spigot ends.

In the past, it has been customary in constructing pipe, to form it with a substantially smooth outer surface. The possibility of providing a smooth bore pipe with a ribbed outer surface has been considered by the art for a great many years, due to the fact that by such construction the thickness of the material forming the pipe could be greatly reduced which would result in a pipe of relatively light weight and low expense. However, it has only been through recent discoveries that an apparatus and process for casting or otherwise forming such a pipe has been devised.

At present it is customary in joining adjacent pipe sections, to secure them together by means of a coupling member adapted to engage threads upon the ends of the pipe section. Other methods of coupling pipe sections together make use of a flange formed upon the end of each pipe section, the flanges on adjacent sections adapted to be bolted together. The disadvantages of both of the methods just outlined are obvious, inasmuch as they require additional expense in providing coupling members as well as the expense of labor required in securing the pipe sections together. It has hence been proposed to do away with coupling joints by providing each pipe section with a so-called bell end and a spigot end, with means associated therewith so that the spigot end of one section may be inserted into the bell end of another and locked therein.

The major object of this invention is the provision of a pipe lacking the inherent disadvantages of those employed in present practice.

An equally important object of the invention is the provision of a pipe having a bell end and a spigot end provided with a novel coupling means so that adjacent pipe sections may be secured to each other.

Another object of the invention is the provision of a light weight ribbed pipe.

Still another object of the invention is the provision of a ribbed pipe having circumferential and axial ribs formed on the outer surface thereof.

A further object of the invention is the designing of a ribbed pipe provided with bell and spigot ends having coupling means formed integral therewith so that adjacent pipe sections may be secured to each other.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

The invention comprehends the provision of a novel pipe. One method of practically effecting the concepts of the invention is to form a pipe having relatively thin walls, and provide upon the external surface thereof a plurality of integrally formed ribs. The invention also comprehends a construction in which the pipe is provided with a bell and a spigot end having a coupling means thereon so that adjacent pipe sections may be engaged with each other and secured together.

In order to make my invention more clearly understood, I have shown in the accompanying drawings, means for carrying the same into practical effect without limiting the improvements in their useful applications to the particular constructions which, for the purpose of explanation, have been made the subject of illustration.

In the drawings:

Figure 1 is a plan view partially in section, of the pipe forming the subject matter of my invention.

Figure 2 is an end view of the spigot end of the pipe shown in Figure 1.

Figure 3 is an end view of the bell end of the pipe shown in Figure 1.

Figure 4 is a longitudinal sectional view taken along the line 4—4 of Figure 3, showing a portion of the bell end of the pipe in detail.

Figure 5 is a longitudinal sectional view taken along the line 5—5 of Figure 3, through one of the cutout portions in the bell end of the pipe.

Figure 6 is a longitudinal sectional view taken along the line 6—6 of Figure 2, showing one of the engaging lugs of the spigot in detail.

Figure 7 is a longitudinal sectional view taken along the line 7—7 of Figure 2 through one of the engaging lugs.

Figure 8 is a longitudinal sectional view through the joint of two coupled pipe sections, and shows the locking channel on the bell end of one pipe section engaged with the lug on the spigot end of the other section.

Figure 9 is a view similar to Figure 8, but shows the locking channel tapering into the thick section of Figure 4 and engaged by the end of the lugs as shown in Figure 7.

As may be noted by reference to the drawings, and particularly to Figure 1, there is disclosed a pipe having a body or barrel 1 upon which is formed a plurality of exteriorly arranged circumferential ribs 2 which are joined by axially extending ribs 3. Each rib 2, as may be noted, lies in a plane which is perpendicular to the longitudinal axis of the pipe, while the ribs 3 lie in planes perpendicular to the transverse axis of the pipe. Thus it may be appreciated that the pipe is formed of a plurality of transverse ribs connected at right angles by longitudinal ribs. To be noted is the fact that the circumferential ribs and the longitudinal ribs are integrally formed with each other, thus affording a strong inter-connected structure.

The advantages of a construction of this nature are obvious inasmuch as it allows a pipe to be formed having walls which are of relatively thin cross section, the ribs performing the function of strengthening the structure. Due to the relative thinness of the cross section of the pipe wall, it will be appreciated that a pipe of comparatively light weight is provided which is capable of meeting any stresses imposed upon it, due to the strengthening qualities of the ribs. With the decrease in the cross sectional thickness of the pipe wall it will also be realized that a decreasing amount of material will be needed to form the pipe so that the expense of the same will be low.

While only four longitudinally extending ribs 3 have been disclosed in the drawings, it is to be understood that any number of these desired may be employed. Likewise it is to be understood that any number of transverse ribs desired may be used. Of course, the spacing between the ribs, the transverse as well as the longitudinal ribs, will depend upon the particular requirements which the pipe must meet. For example, by the use of a great number of ribs for a certain specified cross sectional thickness of the pipe wall, the strength of the pipe will be greatly increased. In addition to varying the number of ribs employed, the thickness of the ribs, the thickness of the pipe wall, any combination of these may be varied as well so as to provide a pipe capable of meeting the requisites demanded of it.

Mentioned as one of the objects of the invention was the provision of means upon opposite ends of a pipe section whereby adjacent sections of pipe could be joined to each other without the use of a separate coupling member. Such means are shown in the drawings, wherein one end of the pipe is formed in accordance with the general design given to the so-called spigot ended pipe, while the opposite extremity is provided with a bell end.

Thus the body of the pipe adjacent the transverse rib 2' is extended for a short distance so that, in effect, it forms a flange 4 adjacent the rib 2'. At definite intervals there is formed upon the flange 4 a plurality of lugs 5. Each of these lugs comprises a central portion 7 of substantially semi-cylindrical cross section. End portions 6 flank each central portion 7 and each end portion 6 is provided with an exposed surface (or side remote from the flange 4) which is in the form of a plane sloping from the central portion 7 down to the flange 4. In plan, this plane is semi-elliptical in outline, as indicated in Figure 1, and these end portions are, for the sake of brevity, referred to as semi-elliptical portions in the specification and claims. Thus, as may be observed in Figure 2, the base of each semi-elliptical portion 6 is substantially flush with the outer surface of the flange 4, while the apex is elevated above the base at the same elevation as the center portion 7.

The shape given to each of the lugs 5 may perhaps be best understood by considering each lug as formed of a rounded bead having a cross section such as that shown in Figure 6. Consider now that two cutting planes are oppositely disposed with respect to each other so as to form equal angles with a line perpendicular to and at the center of the imaginary bead. Also considering that these planes, as described, cut inwardly towards the surface of the flange 4 from points at equal distances from the center of the bead, the lugs shown in the drawings will be obtained. The cutting planes will hence leave the center portion, which might be called the original bead portion flanked by the semi-elliptical portions sloping from the center of the lug downwardly towards the flange surface. Thus it will be apparent that the cross section of each center portion 7 will appear as shown in Figure 6, while the cross section of the semi-elliptical shaped portion 6 will have a contour such as that shown in Figure 7. The semi-elliptical portion 7, it will be noted, is of triangular shape in longitudinal section. The cutting action of the planes, it will be appreciated, will leave the sides of the semi-elliptical portions rounded.

It will be noted that in the formation of the lugs, according to the manner just described, the outer surface of the semi-elliptical portions 6 will be substantially inclined planes. The lugs 5, as is apparent in Figure 1, have their planiform tapered. This is accomplished by reason of the fact that the cross section of each lug, at its central high portion 7, is of greater width than its cross section at any other portion of the lug. The side of each lug adjacent the rib 2' along the line where it joins the pipe barrel, is of substantially V-shape with the apex of the V farthest from the rib, and in a plane passing through the central high portion of the lug and perpendicular to the pipe barrel. From an inspection of Figures 1 and 2, it may be observed that the end of the flange 4 is provided with a bevel 8, which as will hereinafter appear, cooperates to form a flush fit with the interior of the bell end of the pipe.

By reference to Figures 1 and 3 which disclose the so-called bell end of the pipe, the manner of securing adjacent pipe sections to each other will be apparent. At the bell end, the pipe body or barrel 1 terminates in a rib or flange 9, the cross section of which has three distinct variable portions, these portions or sections being arranged in series around the circumference of the pipe.

As may be noted, flange 9 is provided with the cutout portions 10 formed by reason of a relatively straight section, see for example, Figures 3 and 5. This straight portion, as may be observed in Figure 3, tapers on both sides from its center into the U-shaped portions or sections 11. Each U-shaped section is of such shape that it provides interiorly of the bell a U-shaped channel 14, which as will hereinafter appear, is adapted to receive the lugs 5 formed on the spigot end of an adjacent pipe section. Flanking each U-shaped section 11, at its end most distant from the cutout section 10, is a relatively thick solid section 12.

Thus it will be appreciated that starting with a cutout section 10 in the flange 9, there will be on one side of it a U-shaped section 11 which joins a solid thick section 12, which in turn runs into a U-shaped section 11, the latter being joined to another cutout portion 10, and so on around the circumference, in the manner described, until the first mentioned cutout portion is reached.

To connect two pipe sections together, the spigot end of one pipe section is placed in line with the bell end of an adjacent section so that the high points 7 of the lugs 5 are in alignment with the cutout portions 10 of the flange 9 on the bell end of the adjacent section. It should be noted that the inner surface of each cutout portion 10 is outside of the inner surface 13 of the pipe barrel. The cutout portions, after alignment such as that described has been made, allow the pipe sections to be moved so that the spigot end of one pipe section is entirely within the bell end of the other, the lugs 5 passing through the cutout portions of the bell end. This having been accomplished, the two sections may be locked or coupled together by holding one of them and rotating the other in either direction. Upon such rotation being performed, the lugs 5 move out of the cutout portions or sections and into the channels 14 provided by the U-shaped sections of the flange 9. Upon continuation of this movement, one end of each lug will abut a thick section 15 of the flange, and further movement of the pipe will be prevented. The relative position of the spigot end of a pipe section coupled to the bell end of another pipe section is disclosed in Figures 8 and 9. In Figure 8, the high portion 7 of a lug is shown engaged with the locking channel, while in Figure 9 the locking channel is shown tapering into a fixed section such as that shown in Figure 4 and it is engaged by the semi-elliptical portion 6 of a lug on the spigot end of the adjoining pipe section.

By reason of the shape given to the lugs, it will be noted that a wedging action is provided, the sides of each lug tightly engaging the sides of its receiving U-shaped channel, while the outer or upper surface of the lug frictionally engaging the top of the channel. It should be noted, that by reason of the construction which forms flanking U-shaped channel sections on each side of each cutout section, no matter in which direction either of the pipe sections being joined is rotated, a locking action will occur. After the pipe sections have been locked in the manner described, it will be appreciated that the wedging action of the lugs will draw the bevel portion of the spigot end of one pipe section against the interior of the bell end of the other section, so as to form a tight fit between the sections. To accomplish this, it will be noted that where the sections 10, 11 and 12 of the bell merge into the pipe body, the interior face thereof is sloped so as to cooperate with the slope of the bevel 8, formed on each spigot end of the pipe sections.

One feature to be noted particularly is the fact that after a plurality of pipe sections have been connected together, the barrels of each section are in perfect alignment. This is insured by reason of the position of the U-shaped channels and U-shaped channel sections in the bell end and the cooperating lugs on the spigot end of each section, the construction shown providing a four point support which prevents relative vertical, horizontal or longitudinal movement between adjoining pipe sections.

From the foregoing description, it is apparent that to withdraw or separate two connected pipe sections, it is only necessary to rotate one section with respect to the other, so that the lugs 5 will cooperate with the cutaway sections 10, after which the two sections may be pulled or otherwise taken apart.

Although in the locking and unlocking of adjacent pipe sections, it has been mentioned that one pipe is maintained stationary while the other is rotated, it will be well understood, by those skilled in the art, that both pipe sections could be rotated together, that is one in one direction and the other in the opposite direction, and the same effect secured.

While only four lugs have been disclosed, it should be noted that this number may be increased or decreased if desired, without departing from the spirit of the invention or the scope of the appended claims. Moreover, the size of the lugs may be varied in accordance to particular construction requirements, in some instances it being desirable to employ a comparatively great number of relatively small lugs and corresponding receiving sections in the bell end, while in other instances it having been found best to employ but a few lugs. If desired, a suitable gasket may be positioned within the interior of the bell end of the pipe, or it may be associated with the spigot end of the pipe, so that a liquid tight connection may be obtained between two adjoining pipe sections.

It is to be understood that the pipe which has been described is not to be limited by size, as obviously it may be of any diameter and length desired. Of course, with the change in dimensions of the pipe, the sizes of the ribs as well as the locking means on the bell and spigot ends may also be varied.

The pipe forming the subject matter of the invention may be formed in any suitable manner, such for example, as by casting or molding. Suitable materials for the pipe include iron, terra cotta, and other similar substances employed for such purposes.

While the bell and spigot ends have been shown incorporated with a ribbed pipe, it is to be understood that they may be used with a pipe having a smooth outer surface. For that matter, if desired, the invention may be applied to a plane ended pipe, that is, one without a bell and spigot end, in such case of course, the pipe would only be provided with the exterior ribs.

From the foregoing description, it will be appreciated that I have provided a novel light weight ribbed pipe capable of many and varied uses. In addition to the many economic advantages accruing from the ribbed construction, it will be apparent that I have in addition, designed a novel means for securing pipe sections together, such means being incorporated directly upon the pipe without the need of intermediate members. With such constructions, as I have outlined above, a pipe has been provided which may not only be constructed at low expense, but which may be installed for relatively low cost.

While I have shown and described the preferred embodiment of my invention, I wish it to be understood that I do not confine myself to the precise details of constructions herein set forth by way of illustration, as it is apparent that many changes and variations may be made therein by those skilled in the art, without departing from the spirit of the invention, or exceeding the scope of the appended claims.

I claim:

1. A pipe formed of a single section and provided with a bell end and a spigot end, the body of said pipe having formed thereon a plurality of longitudinally and transversely extending ribs, the bell end of said pipe being formed of an annular flanged rib encircling the pipe body, said flange being provided with a plurality of cut-out sections of a width decreasing from their center so as to taper into a U-shaped section on each of their sides, said U-shaped sections affording a U-shaped channel within the flange, thick solid sections formed upon the flange intermediate of each U-shaped section, the spigot end of said pipe being provided with a plurality of lugs formed upon the body of the pipe.

2. A pipe section comprising a barrel portion, a bell-end and a spigot-end, a locking lug extending circumferentially about the spigot-end, such locking lug being formed of a central portion of partially cylindrical cross section and end portions provided with plane surfaces angularly disposed to each other, the bell-end formed with an annular flange in which there is a cut-out portion adapted to initially receive a locking lug of an adjoining section, and substantially U-shaped channels extending from each side of said cut-out portion and decreasing in size.

3. A pipe section comprising a barrel portion, a bell-end, and a spigot-end, a plurality of locking lugs extending circumferentially about the outer periphery of the spigot-end, each of such locking lugs being formed of a central portion of partially cylindrical cross section, and end portions provided with plane surfaces angularly disposed to each other, and with a base equal in width to the base of the central portion; the bell-end of said section being formed with an annular flange in which there are cut-out portions adapted to initially receive the locking lugs of an adjoining section, and substantially U-shaped channels of progressively decreasing size extending from each side of said cut-out portions.

4. A pipe section provided with a bell and a spigot end, the bell end being formed of an annular rib encircling the pipe body, said rib being provided with a plurality of cut-away sections, said cut-away sections having at each side thereof substantially U-shaped undercut grooves terminating short of the mid-point between two adjacent cut-away sections, and means formed upon the spigot end and adapted to cooperate with said groove of an adjacent pipe section for wedgingly locking said means in said grooves in both axial and radial directions.

5. A pipe section provided with a bell and a spigot end, the bell end being formed of an annular rib encircling the pipe body, said rib being provided with a plurality of cut-away sections, said cut-away sections having at each side thereof progressively decreasing undercut grooves of substantially U-shape terminating short of the mid-point between two adjacent cut-away sections, and lugs formed upon the spigot end and adapted to cooperate with said groove of an adjacent pipe section for wedgingly locking said lugs in said grooves in both axial and radial directions.

EPHRAIM O. NORMAN.